Aug. 18, 1936.                W. H. DE LANCEY                2,051,165
LIQUID DISPENSING APPARATUS
Filed March 23, 1931          3 Sheets-Sheet 1
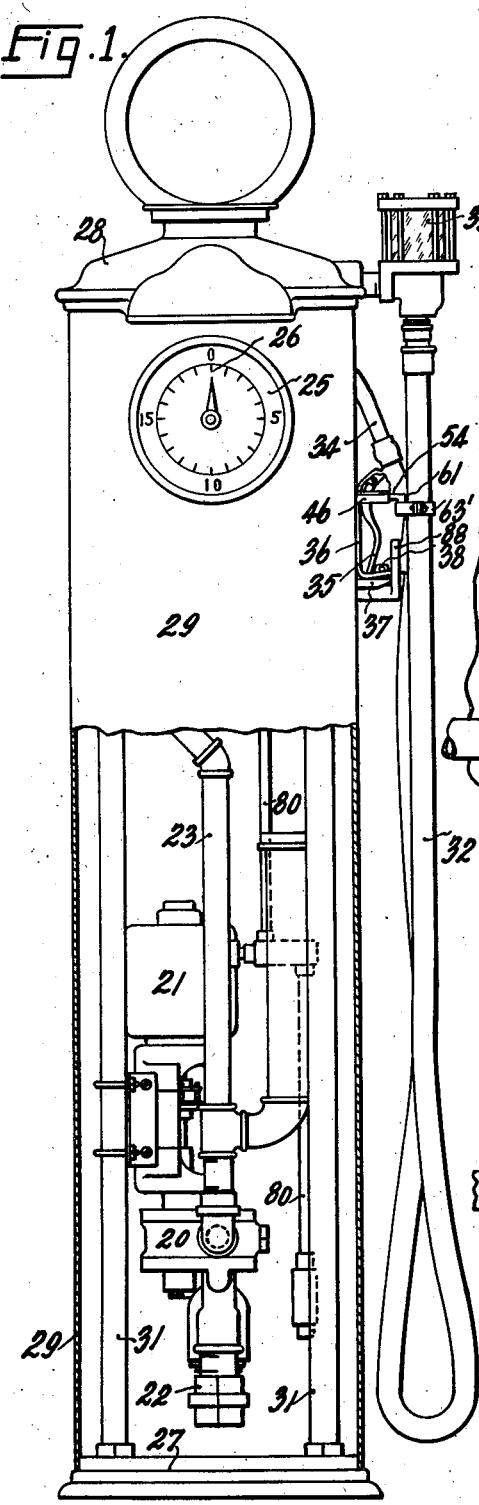
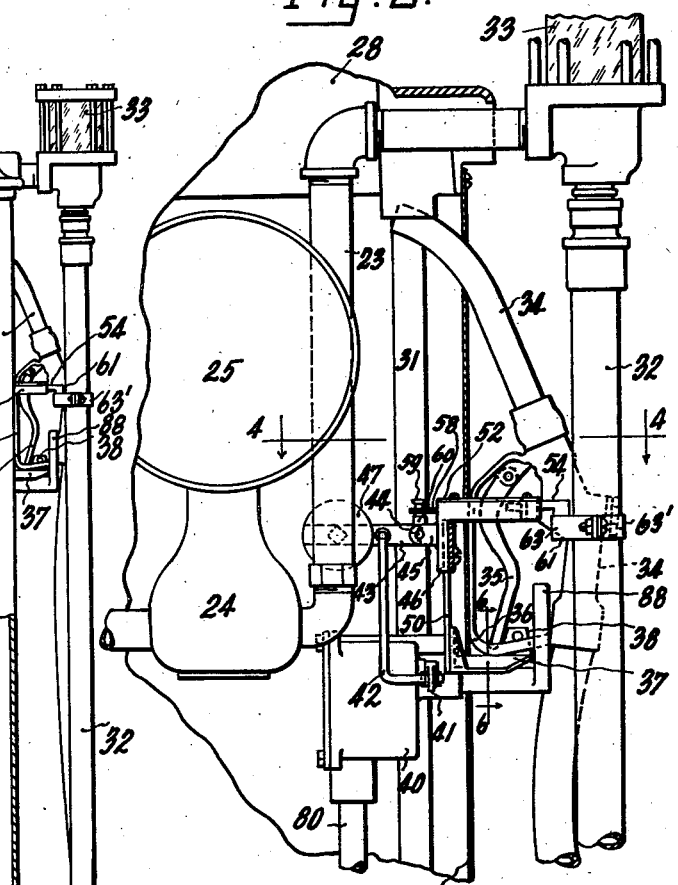
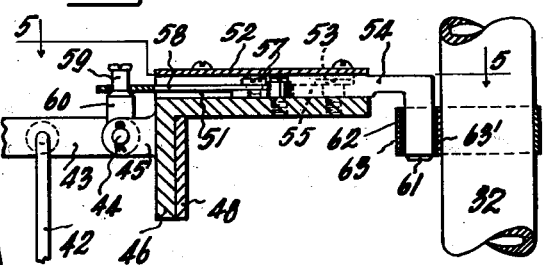
INVENTOR.
WARREN H. DE LANCEY
BY Chapin & Neal
ATTORNEYS.

Aug. 18, 1936.   W. H. DE LANCEY   2,051,165
LIQUID DISPENSING APPARATUS
Filed March 23, 1931   3 Sheets-Sheet 2

INVENTOR.
WARREN H. DE LANCEY
BY Chapin & Neal
ATTORNEYS.

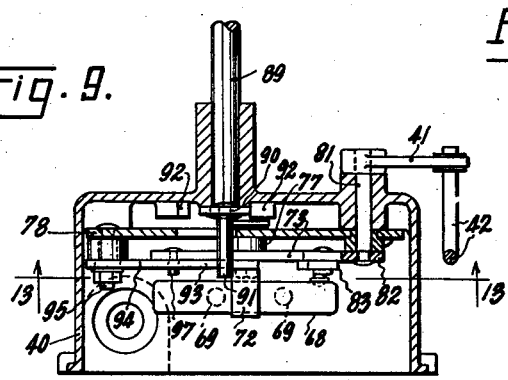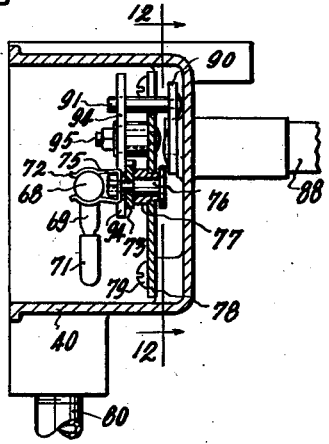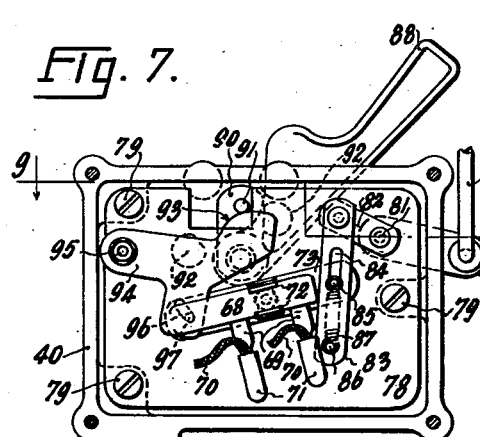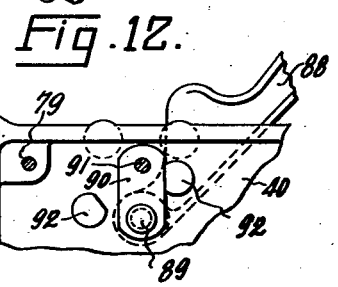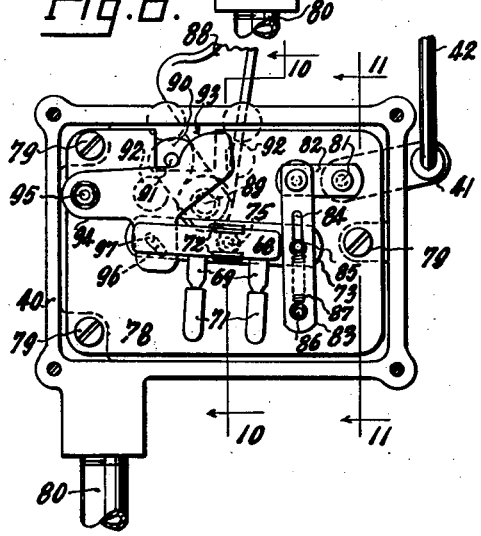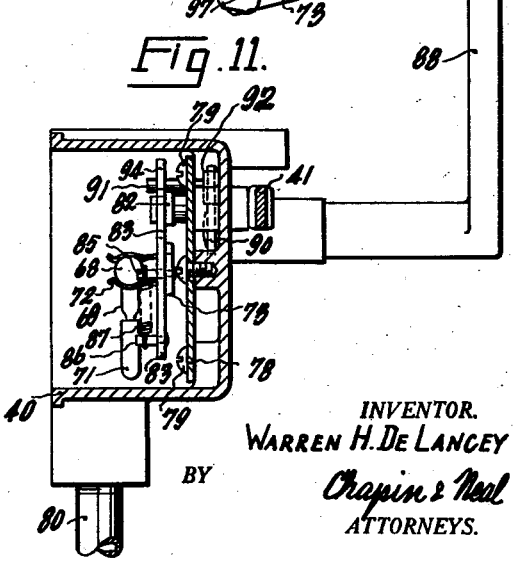

Patented Aug. 18, 1936

2,051,165

UNITED STATES PATENT OFFICE 2,051,165

LIQUID DISPENSING APPARATUS

Warren H. De Lancey, Springfield, Mass., assignor to Gilbert & Barker Manufacturing Company, West Springfield, Mass., a corporation of Massachusetts Application March 23, 1931, Serial No. 524,581

7 Claims. (Cl. 221—95)

This invention relates to improvements in flow controlling mechanism for dispensing systems. It is particularly applicable to the control of a liquid pumping system, such as is used for dispensing, and usually measuring gasoline, although it is not necessarily confined to such use. The particular type of flow control mechanism, with which the invention is concerned, is that in which control of the flow may be effected from a remote point, such for example as at the discharge end of the hose, by mechanism actuated by a pull on the hose or a bending or deflection of the same.

The invention has for an object to provide an improved mechanism for the purpose, which is substantially fool proof, of sturdy construction calculated to stand up under rough usage, and of a construction such as to function surely and effectively under all sorts of severe conditions encountered in practical service.

The invention also has for an object the provision of a flow control mechanism which includes a chain of interconnected rigid elements between the flow control element and hose, which will function properly and smoothly irrespective of the direction in which the hose is pulled or deflected, within the limits of a wide range, say at least 180 degrees.

The invention also has for an object to provide means for rendering the "hose pull" mechanism ineffective to operate the flow control element when the hose nozzle is hung up in locking position and for compelling the movement of the control element into position to stop the flow as a prerequisite to placing the nozzle in locking position.

These and other objects will more particularly appear as the detailed description proceeds and will be pointed out in the appended claims.

The invention will be disclosed with reference to the accompanying drawings, in which:—

Fig. 1 is a small scale front elevational view, partly in section, of a gasoline dispensing pump embodying the invention;

Fig. 2 is a fragmentary sectional elevational view thereof, drawn to a larger scale;

Fig. 3 is a sectional elevational view of the switch operating mechanism;

Figs. 7 and 8 are sectional elevational views taken on the line 7—7 of Fig. 4, showing the switch in closed and open positions, respectively;

Fig. 9 is a sectional plan view taken on the line 9—9 of Fig. 7;

Figs. 10 and 11 are cross sectional views taken on the lines 10—10 and 11—11 respectively of Fig. 8;

Fig. 12 is a fragmentary sectional elevational view taken on the line 12—12 of Fig. 10; and Fig. 13 is a fragmentary sectional elevational view taken on the line 13—13 of Fig. 9.

Figure 6:
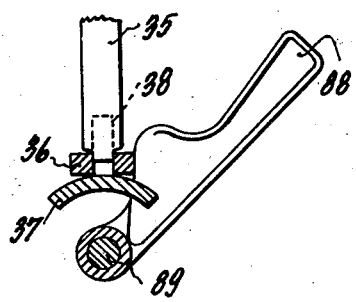
Fig. 6 is a sectional view taken on the line 6—6 of Fig. 2.

In these drawings, the invention has been disclosed, by way of illustrative example, in connection with a well known type of gasoline dispensing and measuring apparatus. Briefly, the apparatus shown includes a suitable pump 20 (Fig. 1), driven by an electric motor 21. Gasoline is drawn up from the underground supply tank through a suction pipe, shown in part at 22, and forced by the pump through a discharge pipe 23. Interposed in pipe 23 is a suitable device, such as a meter 24 (Fig. 2), to measure the quantity of liquid passing through pipe 23. The indications of the meter are shown on a dial 25 (Fig. 1) by a pointer 26. This apparatus is usually enclosed in a suitable housing, such as that shown, which comprises base and cap members 27 and 28, respectively, and a sheet metal casing 29 enclosing the space between them. The base and cap are tied together by a series of pipe columns 31 and these serve to support the motor and pump, as indicated, as well as other parts later to be described. The discharge pipe 23 passes out of the housing near the upper end thereof and is connected to a flexible hose 32, usually through the intermediary of some suitable flow indicating device, such as 33. The discharge end of hose 32 is generally equipped with a valved nozzle 34,—that shown having a valve operating lever 35 and a guard 36 for the same. The nozzle, when not in use, is usually hung up on a fixed support, such as that shown at 37, which has an upstanding lug 38, passing through a slot in the guard, as shown in Fig. 6. This lug may be utilized, if desired, to prevent movement of lever 35 in a direction such as to open the valve of nozzle 34, as indicated in Fig. 2. When liquid is to be dispensed, the nozzle 34 is removed from its support 37 and carried to the point of delivery, the flow being controlled (after pumping has been started) by the nozzle valve operated by lever 35.

The problem of this invention relates to controlling the liquid forcing means, whatever its particular character may be, from a remote point, such as the delivery point for example. In the present case, the operator, remotely stationed at the discharge end of the hose must be able to start and stop the motor 21 but the liquid forcing means may take various forms and the invention is not necessarily limited in all its features to the remote control of an electric motor, although that is the form herein shown and now preferred. The particular expedient adopted to secure the remote control is one which is broadly old and suggested in numerous patents in the prior art,—viz., the utilization of a pull on the hose to effect the operation of some suitable flow control element such as a switch or valve or both, as may be necessary or desirable with the particular form of liquid forcing means used. This invention is concerned more particularly with the mechanism interposed between the hose and the switch or other member to be operated, and provides a distinctly better, more practical and substantially fool proof mechanism for the purpose in view.

Figure 4:
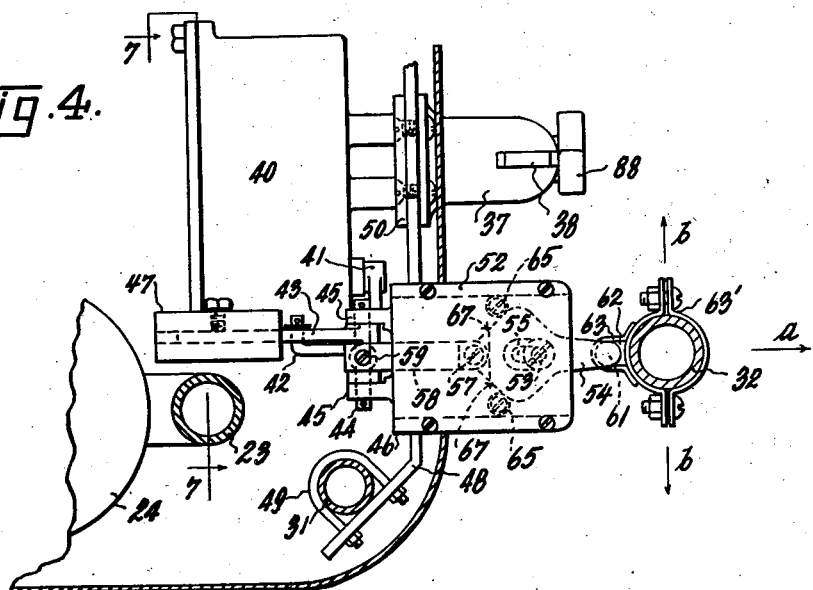
Fig. 4 is a fragmentary sectional plan view taken along the line 4—4 of Fig. 2.

The flow control element in the form of the invention illustrated consists of a switch for controlling motor 21. This switch is contained within a box 40 and is operated by an arm 41 pivotally mounted in one wall of the box. This arm is connected by a bent link 42 to an arm 43, pivoted on a stud 44 carried by and extending between a pair of lugs 45, fixed to a frame 46. The arm 43 carries a weight 47 which is sufficiently heavy to hold the parts in the illustrated position in which the switch is open, also to draw the hose 32 back into the normal position shown in Figs. 2 and 4. The frame 46 is fastened, as indicated in Fig. 1, to a cross bar 48 which extends across between a pair of the columns 31, as indicated in Fig. 4, and is suitably secured thereto as by U-bolts 49. The switch box 40 is also supported from this cross bar through the intermediary of a plate 50 (Figs. 2 and 4). Frame 46 is right angular in shape and has a horizontal part which extends outwardly through and beyond casing 29,—such part being recessed to form a channel 51 extending from end to end thereof. A cover plate 52, secured to frame 46, closes the top of this channel. Secured to frame 46 centrally and near the front end thereof, is a stud 53 and slidably as well as turnably engaged therewith is a member 54, having a slot 55 to receive the body of the stud and a counterbore 56 to receive the head of the stud. The rear end of member 54 is connected by a stud 57 to one end of a link 58 and the rear end of the link encircles a stud 59 secured to part 60 upstanding from the hub of arm 43. The front end of member 54 projects beyond the channel 51 and terminates with a downturned cylindrical pin 61, which is received in a socket 62 formed by a strap 63 suitably fastened, as by welding, to one part of an ordinary two part hose clamp 63' secured to hose 32.

If the hose 32 is pulled forwardly in a straight line in a path indicated by the arrow a in Fig. 4, the member 54 will simply slide on stud 53, acting purely as a link to communicate the pull to link 58 and thence to lever 60—43 and the switch operating arm 41 connected therewith. The sliding motion of member 54 is limited by the confines of slot 55. The weight 47 normally holds the member 54 so that the outer end of the slot abuts stud 53. A pull on the hose will draw the member outwardly until the inner end of the slot abuts the stud. This allows enough motion to be imparted to lever 41 to close the switch but prevents excess motion from being communicated thereto. The strains from an undue pull on the hose are taken by the stud 53 and prevented from acting on the switch to damage the same.

A true straight line pull on the hose in the path of arrow a cannot be expected. The operator may just as likely pull on the hose in a direction at right angles to such path, such as either of those indicated by the two arrows b in Fig. 4 or in various directions in between these two extremes. The switch operating mechanism must function perfectly under all these conditions. There must be no binding in the link and lever connections. A pull on the hose from any angle, throughout the described range of substantially 180 degrees, must not be able to cause damage such as bending or breaking of the parts of the switch operating mechanism or a binding of such parts so as to defeat proper and effective operation. Also, such mechanism must be proof against injury due to careless operation, such as by an excessive degree of pulling on the hose and excessive strains due to a sudden yank of the hose, as distinguished from a careful steady pull on the same.

Figure 5:
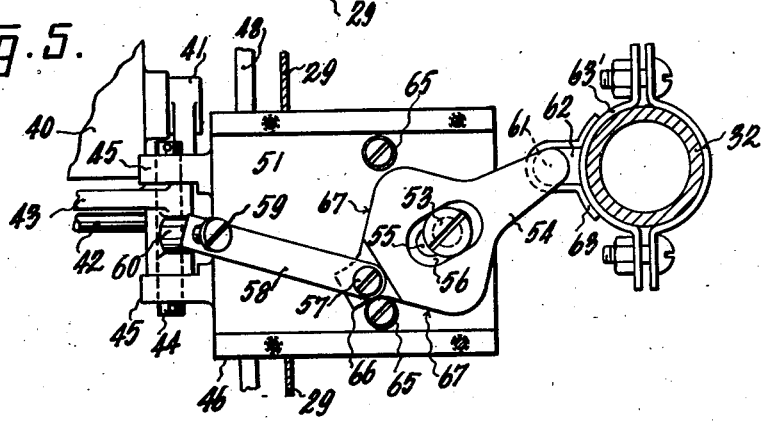
Fig. 5 is a sectional plan view taken on the line 5—5 of Fig. 3 but showing the parts in different relative positions.

To meet these conditions, insofar as variation in the angle of pull is concerned, the member 54 is arranged to pivot as well as slide on its stud 53. A sidewise displacement of the hose in the path of arrow b will swing the member 54 on its pivot and cause it to function to some extent as a lever to draw the link 58. In this action, the member 54 will slide on the stud to some extent but not necessarily to the limit of slot 55. This condition is shown in Fig. 5. It is necessary to provide some means other than slot 55 to limit the swinging movement of member 54 and for this purpose a pair of rolls 65 are provided, mounted on studs secured to frame 46 and disposed one on each side of member 54 near the rear end thereof. It will be clear from Fig. 5 how one of these rolls acts to limit the degree of swinging movement of member 54 in one direction and it will be obvious that the other roll acts in a similar way when the member is swung in the opposite direction. Although the member 54 can still slide a short distance on stud 53, it cannot slide far enough to disengage the tail piece 66 of member 54 from roll 65. If desired, and the action of the mechanism is somewhat smoother in such case, inclined planes 67 may be provided on member 54 to cooperate with rolls 65. As the member 54 is swung, one or the other of these planes 67 cooperates with the adjacent roll 65 like a cam and forces the member to gradually and smoothly slide outwardly as it is turned.

The pin 61 and socket 62 afford an easily disengageable connection between the hose 32 and the switch operating member 54. In the remote event that the hose should be pulled free from the end of the discharge pipe 23, the socket member 63 would drop and become disengaged from pin 61. The motor switch, if open at the time as it probably would be, will then close under the influence of weight 47 and flow of liquid from the open end of the discharge pipe will be prevented.

The motor switch is shown in Figs. 7 to 13 inclusive. As herein shown, it is of the tiltable mercury tube type. The glass tube indicated at 68 has contact containing parts 69 to which the lead wires 70 are held by rubber tubes 71. The tube 68 is held in a spring clip 72 fixed to a lever 73 by a nut 75 (Figs. 8 and 10), which also serves to clamp to the lever a stud 76. This stud is turnably mounted in a bearing 77 (Fig. 10) fixed to a plate 78, which in turn is fixed to the switch box by screws 79 in a location within the box and in spaced parallel relation with the rear wall thereof. The stud 76 forms the pivot for the tube carrying lever 73 and the latter can swing from the open position shown in Fig. 7 to the closed position shown in Fig. 8. In the latter position, It will be understood that the lead wires 70 are connected together by the mercury within the tube in the usual and well known manner. It will also be understood that the lead wires are suitably connected in circuit with motor 21 and a suitable source of electricity in the usual and well known way,—the wires passing through the conduit 80 shown as connected both to switch box 40 and motor 21.

The switch operating arm 41, heretofore described, is fixed to the outer end of a stub shaft 81 mounted to turn in the rear wall of box 40. Within the box and fixed to the inner end of shaft 81 is an arm 82, pivotally connected to the free end of which is a depending link 83. This link has a longitudinal slot 84 therein, in which rides a pin 85 fixed to lever 73 near one end thereof. Fixed to the lower end of link 83 is a pin 86 which is connected to pin 85 by means of a coil spring 87. In the movement of lever 82 downwardly to close the switch, the link 83 is pushed downwardly and moves the lever 73 only through the intermediary of spring 87. This spring forms a yieldable element in the chain of parts comprising the transmission between the hose and switch. The spring can yield, if and when necessary, and allow travel of lever 82 without moving the switch lever 73, as will appear. Also, it acts as a shock absorber to prevent sudden shocks, imparted to the link and lever connections from hose 32, from being transmitted to the glass tube switch and damaging the same.

It is important to provide means for preventing operation of the switch when the pump is locked up at night. The parts are shown in "lock up" position in Fig. 2. The lug 38 is perforated to receive a padlock which holds the hose nozzle 34 to its support 37. Access to the nozzle, or operation of the same, is then prevented. Still one could pull on the hose and effect a closing of the motor switch unless means were provided to prevent such action. It is also desired to insure opening of the motor switch before the hose nozzle can be placed in "lock up" position. Usually the hose, when released by the operator, will be pulled back by weight 37 into the normal position shown in Fig. 2 and an opening of the switch will automatically result. However, there is a remote possibility that the hose might become twisted or caught on some obstruction in such a way that its return to normal position by weight 47 would be prevented. In such case, the operator will be forced, by the means to be described, to open the switch before he can hang up the hose nozzle in "lock up" position.

The means for effecting the results just described include a handle 88 fixed to the outer end of a shaft 89, the inner end of which is mounted in a bearing in the rear wall of box 40. Shaft 89 has fixed to its inner end an arm 90 (Figs. 9 and 12) and fixed to the outer part of this arm is a forwardly projecting pin 91. The arm 90 is limited in its swinging movement by a pair of abutments 92 formed on and projecting inwardly from the rear wall of the box as best shown in Fig. 12. Pin 91 rides on a cam surface 93 (Fig. 7) formed near one end of a lever 94, which is pivoted at its other end on a stud 95 fixed to plate 78. Intermediate its ends, lever 94 has a cam slot 96 into which a pin 97 secured to lever 73 extends. The pin 97 and slot 96 interconnect levers 73 and 94 so that each must swing with the other.

In normal operation (when the handle 88 is positioned as shown in Fig. 8) the lever 94 will swing freely up and down as lever 73 is moved to close and open the switch, respectively. It will also be clear that lever 88 can be moved from the position shown in Fig. 8 to that shown in Fig. 7 to open the switch and this can be accomplished even though the normal switch operating means, which includes arm 41 and link 42 remain in the positions shown in Fig. 8. As the handle 88 is turned clockwise from the position shown in Fig. 8, pin 91 will ride along cam 93 and force lever 94 downwardly, which will cause pin 97 to be forced down and lever 73 tilted in such a way as to open the switch. Such movement of lever 73 is permitted because pin 85 is free to ride upwardly in slot 84,—the spring 87 yielding to permit the action. If, however, the switch has already been opened by the normal means described, then the described movement of arm 88 will do no more than move pin 91 into position to lock lever 94 in the position shown in Fig. 7 and the switch in open position. With the parts positioned as in Fig. 7, the switch is locked in open position and no movement of the normal switch operating means can be effective. Thus, suppose lever 41 is moved up from the position shown in Fig. 7, the link 83 will be depressed and the spring 87 will be stretched without moving pin 85 and lever 73.

Lever 88 is arranged so that when positioned vertically as in Fig. 8 it interferes with the placing of the hose nozzle 34 on support 37. Thus, the operator is compelled to move lever 88 into the position shown in Figs. 6 and 7 before he can hang up the nozzle on the support and, when he does so, the switch, if not already opened, is opened and in any case it is positively locked in open position. The handle 88 swings in a path just in front of the free end of support 37 and thus in non-interfering relation therewith but, when the nozzle is placed on the support, it projects beyond such end and into said path to block movement of the lever as will be clear from Figs. 2 and 6. When a padlock is applied to lug 38, the nozzle is not only locked in inactive position but handle 88 is also locked in the position of Fig. 7 and this insures that the switch is open and locked in open condition against movement by the normal operating means which are actuated by a pull on the hose. Thus, with the parts in "lock up" position, a pull on the hose 32 although possible, is rendered ineffective to effect operation of the switch.

The operation of the apparatus will next be described. Assuming that the hose nozzle 34 is in "lock up" position on its support 37, as shown complete in Fig. 2 and in part in Fig. 6, the operator first removes the nozzle from the support, thus clearing the obstruction in the path of movement of handle 88. Next he swings this handle from the position shown in Figs. 6 and 7 to that shown in Fig. 8, thereby unlocking the switch by withdrawing pin 91 out of interfering relation with lever 94. The switch is now unlocked and free for operation in the normal manner. The operator, in serving a customer, carries the nozzle 34 to the tank to be served, which is usually sufficiently remote from the pump so that the operator cannot easily reach the same to operate a control element, such as 88 for example. However, he can readily pull on the hose and that pull is made to operate the switch through the transmission chain of pivotally connected but independently rigid elements 54, 58, 60, 43, 42 and 41. When the pull on the hose is relaxed, the weight 47 pulls it back and restores the switch operating mechanism to normal position and the switch to open position. When the dispensing operation is over, the operator hangs up nozzle 34 on support 37 but, before this can be done, handle 88 must be moved to the position shown in Fig. 7, thereby opening the switch if not already open and locking it in open position against operation by an accidental pull on hose 32.

While the idea of utilizing a pull on a hose as a means of actuating a motor switch, or other equivalent flow control element, is old, there are important novel features in the particular mechanism herein disclosed for the purpose. The arrangement, whereby the hose when pulled from any angle over a wide range (at least 180 degrees), operates a chain of pivotally connected rigid parts smoothly and effectively, is thought to be important as providing a distinctly better and more nearly fool proof mechanism for the purpose in view. The provisions for rendering the "hose pull" mechanism ineffective to operate the switch or other control, except when the hose nozzle is removed from its support, is also considered novel and important both broadly and in connection with subsidiary features.

The invention has been disclosed herein, in an embodiment at present preferred, for illustrative purposes, but the scope of the invention is defined by the appended claims.

What I claim is:

1. In a dispensing system, a discharge pipe, a flexible hose attached at one end thereto, a nozzle on the other end of the hose, a support on which the nozzle may be hung when not in use, an element movable to control the flow through said pipe and hose, means interconnecting said element and hose for moving the element by pulling on the hose, means for locking said element in position to stop said flow, said first named means including a member through which the force from the pulling of the hose is transmitted to said element and which is yieldable under said pulling force when such force is applied while said element is locked.

2. In a dispensing system, a discharge pipe, a flexible hose attached at one end thereto, an element movable to control the flow through said pipe and hose, means interconnecting said element and hose for moving the element by pulling on the hose, means for locking said element in position to stop said flow, said first named means including a member through which the force from the pulling of the hose is transmitted to said element and which is yieldable under said pulling force when such force is applied while said element is locked.

3. In a dispensing system, a discharge pipe, a flexible hose attached thereto, a movable element to control the flow through said pipe, connections between said element and hose whereby said element may be moved by pulling on the hose; said connections including a member mounted for movement in directions substantially radially with respect to the hose, and a pin and socket connection between said member and hose; the axis of said connection being substantially parallel to that of the hose and the pin and socket being disengageable in event the hose is pulled free from the discharge pipe; and means tending normally to hold said element, connecting means and hose in position to stop the flow through said pipe.

4. In a dispensing system, a discharge pipe, a flexible hose attached at one end thereto, an element movable to control the flow through said pipe and hose, a transmission chain of interconnected elements between said hose and control element for moving the element by a pull imparted to the hose, said chain including a pair of links pivotally connected and disposed in end to end relation and normally in alignment, one of said links connected at one end to said hose, a fixed support for said last named link and a pin and slot connection therebetween enabling limited longitudinal sliding movement of such link when the hose is pulled in the direction in which the links are normally aligned, and pivotal movement thereof when the hose is pulled at right angles to the aforesaid direction.

5. In a dispensing system, a discharge pipe, a flexible hose attached at one end thereto, an element movable to control the flow through said pipe and hose, a transmission chain of interconnected elements between said hose and control element for moving the element by a pull imparted to the hose, said chain including a pair of links pivotally connected and disposed in end to end relation and normally in alignment, one of said links connected at one end to said hose, a fixed support for said last named link and a pin and slot connection therebetween enabling limited longitudinal sliding movement of such link when the hose is pulled in the direction in which the links are normally aligned, and pivotal movement thereof when the hose is pulled at right angles to the aforesaid direction, and means for limiting the extent of swinging movement of the last named link in either direction.

6. In a dispensing system, a discharge pipe, a flexible hose attached at one end thereto, an element movable to control the flow through said pipe and hose, a transmission chain of interconnected elements between said hose and control element for moving the element by a pull imparted to the hose, said chain including a pair of links pivotally connected and disposed in end to end relation and normally in alignment, one of said links connected at one end to said hose, a fixed support for said last named link and a pin and slot connection therebetween enabling limited longitudinal sliding movement of such link when the hose is pulled in the direction in which the links are normally aligned, and pivotal movement thereof when the hose is pulled at right angles to the aforesaid direction, said last named link having oppositely disposed cam surfaces, and rolls mounted on said support one on each side of the last named link for cooperating with said cam surfaces to force the same to slide outwardly as it swings on said pin.

7. In a dispensing system, a discharge pipe, flexible hose attached at one end thereto and depending therefrom, a movable element to control the flow through said pipe and hose, connections between said element and hose for operating the element by deflections of the depending part of the hose, said connections including a member connected to a depending part of the hose near its point of attachment to said pipe, and a support in which said member is mounted with freedom to slide throughout a limited range in a direction substantially radially with respect to said part of the hose and to turn throughout a limited range about and axis substantially parallel to that of said part of the hose, whereby said element may be actuated by a deflection of said part of the hose away from the support in a direction in line therewith or by a deflection at right angles to the first named direction or by deflections in directions at any angle between the limits of the aforesaid directions.

WARREN H. DE LANCEY.